United States Patent [19]

Swisher

[11] 4,324,070
[45] Apr. 13, 1982

[54] SELF-WATERING PLANTER

[76] Inventor: Carolyn L. Swisher, 1100 6th St., SW., Apartment #415, Washington, D.C. 20024

[21] Appl. No.: 143,493

[22] Filed: Apr. 24, 1980

[51] Int. Cl.³ .............................................. A01G 27/00
[52] U.S. Cl. ...................................................... 47/81
[58] Field of Search .................... 47/66, 69, 71, 79, 80, 47/81

[56] References Cited

U.S. PATENT DOCUMENTS

| 265,097 | 9/1882 | Johnston | 47/81 |
|---|---|---|---|
| 320,588 | 6/1885 | Rhoads | 47/81 |
| 1,264,096 | 4/1918 | Lelievre | 47/81 |
| 1,342,786 | 6/1920 | White | 47/81 |
| 3,786,598 | 1/1974 | Stadelhofer | 47/81 |

FOREIGN PATENT DOCUMENTS

| 233181 | 1/1960 | Australia | 47/81 |
|---|---|---|---|
| 55391 | 2/1891 | Fed. Rep. of Germany | 47/81 |
| 1134981 | 4/1957 | France | 47/81 |
| 1173421 | 12/1969 | United Kingdom | 47/81 |
| 2033196 | 5/1980 | United Kingdom | 47/81 |

*Primary Examiner*—James R. Feyrer
*Attorney, Agent, or Firm*—Lowe, King, Price & Becker

[57] ABSTRACT

A self-watering planter having reduced evaporative losses is disclosed. The planter includes a water reservoir having at least one sealable opening for receiving water therein, a wick and mat assembly disposed atop the reservoir, and a plant container disposed atop the absorbent mat. A portion of the wick is immersed in water contained in the reservoir to transfer water to the absorbent mat. Openings formed in the base of the plant container allow moisture from the mat to be drawn into growing media disposed within the plant container. The plant container includes a downwardly extending rim formed as part of its base which completely covers and seals the absorbent mat when the plant container is seated atop the water reservoir to prevent evaporation of moisture from the mat directly to the atmosphere. In one embodiment, complementary openings are formed in respective wall and top portions of the plant container and water reservoir which, when aligned, allow the reservoir to be filled with water without removing the plant container or absorbent mat assembly. When the plant container is rotated so that the water-receiving openings are misaligned, the water reservoir is sealed to prevent evaporation of water directly to the atmosphere. In an alternative embodiment, the sealable opening is formed in a wall of the water reservoir, with a removable stopper inserted therein to prevent evaporation of water in the reservoir directly to the atmosphere.

7 Claims, 6 Drawing Figures

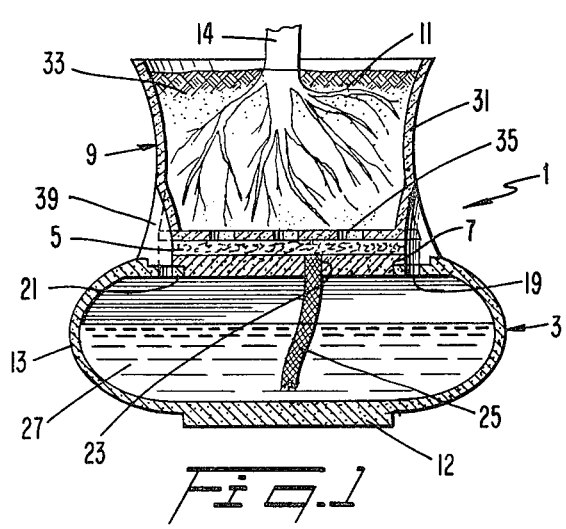
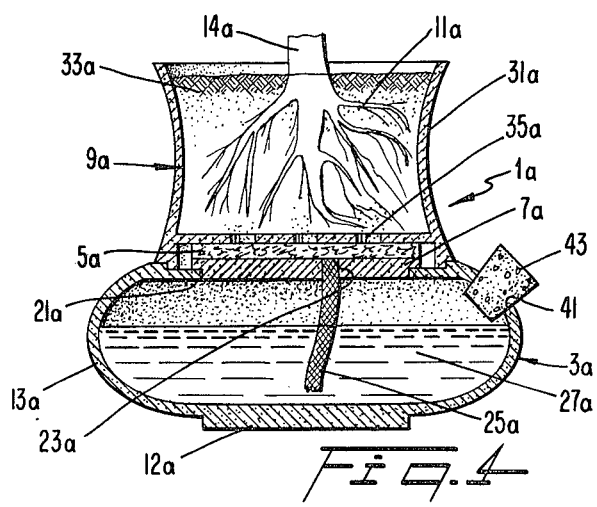
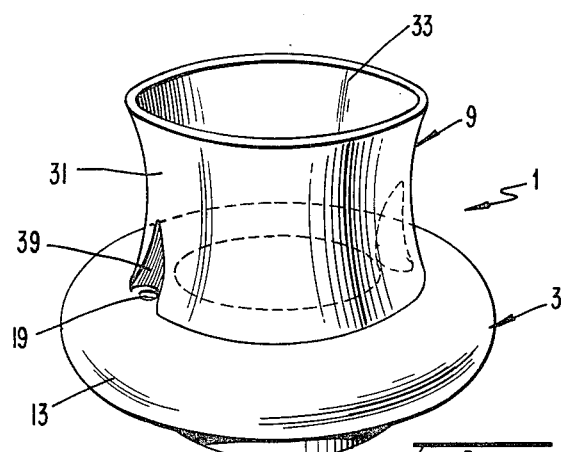
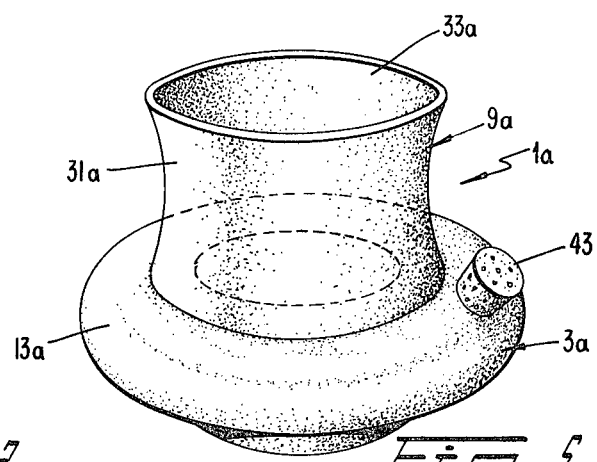
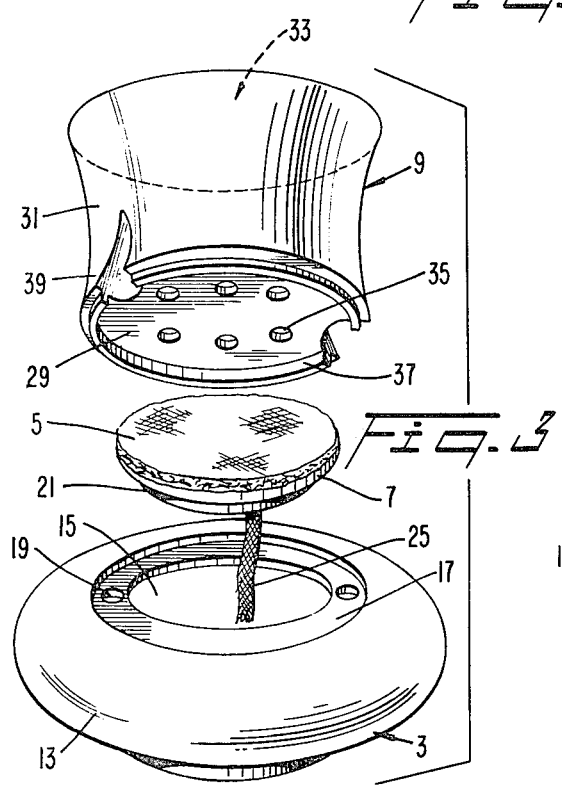
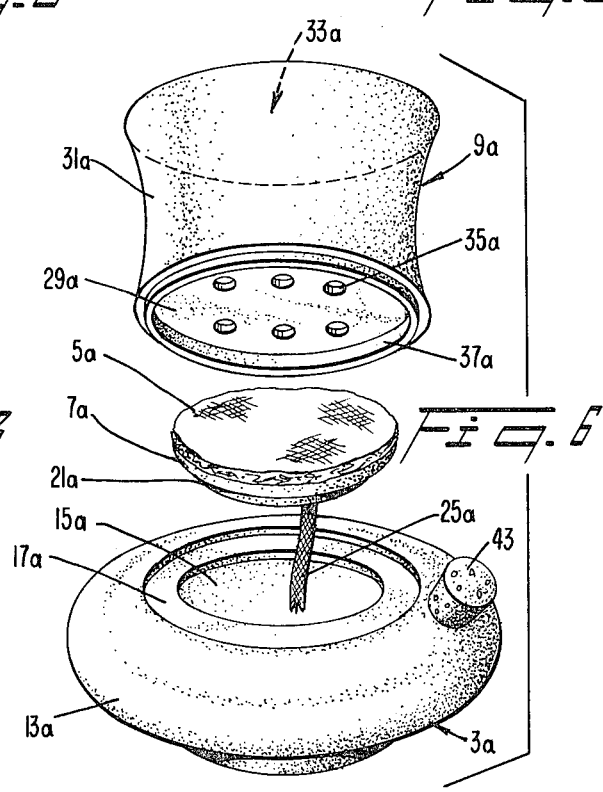

SELF-WATERING PLANTER

BACKGROUND OF THE INVENTION

1. Field of the Invention

The invention relates to the field of plant containers, and more particularly to a self-watering planter having reduced evaporative losses.

2. Description of the Prior Art

It is well known that most plants grow best when supplied at a constant rate with the proper amount of moisture to their root system. Watering of a large number of plants, such as in a plant store or in a large office building, can be a burdensome chore. The task is further complicated because not all plants require the same amount of water during a given period of time. Some types of plants require daily watering. However, it is not always possible to water plants on a daily basis, such as when a person is on vacation or when a store or office building is closed for the weekend or a holiday. Such neglect is often harmful to plants.

To this end, self-watering planters have been developed which include a shallow dish or water reservoir and a separate plant container or pot resting on a support elevated above the level of water in the water reservoir. A wick or other type of absorbent means has one end disposed through an opening formed in the lower portion of the plant container and the other end immersed in the water contained in the reservoir. The water is drawn up through the wick and into the growing medium of the pot through capillary action.

Alternatively, the plant container rests on an absorbent mat disposed upon a support above the water level of the reservoir. The absorbent mat includes a wick portion inserted in the water reservoir. Water is drawn up through the wick to wet the mat. Moisture from the mat is communicated to the growing media in the plant container through one or more openings formed in the base of the plant container. The edges of the absorbent mat are exposed directly to the air. Known types of self-watering plant containers include a reservoir having an open top or openings formed in the top of the reservoir to receive water for refilling and to allow ready observation of the water level therein.

Known types of self-watering plant containers suffer from the disadvantage that water contained in the water dish or reservoir and absorbed by the wick or mat is in direct contact with the surrounding atmosphere and thus evaporates quickly to the atmosphere, rather than being used to maintain the desired moisture level in the plant container. As a result, the growing media in the plant container can dry out if the water level in the reservoir or dish is not closely monitored. Under some conditions, such as when the relative humidity of the ambient air surrounding the plant container is extremely low, evaporation from the uncovered water reservoir and exposed edges of the absorbent mat can be so great that moisture already in the plant container and growing media is actually drawn back out into the absorbent mat and evaporates, thus drying out the growing media of the plant container and harming the plants growing therein.

Thus, there is a distinct need for a self-watering planter which has a low evaporative water loss rate and which maintains the proper moisture level within the plant growing medium.

OBJECTS OF THE INVENTION

It is therefore an object of the invention to provide a self-watering planter having reduced evaporative water losses.

It is a further object to provide a self-watering planter which maintains a constant moisture supply to a plant growing medium.

It is an additional object to provide a self-watering planter which requires little care or maintenance and which can go for a considerable period of time without refilling with water.

It is still another object to provide a self-watering planter which is decorative, easily manufactured, and adaptable to various sizes of plant containers.

SUMMARY OF THE INVENTION

These and other objects are achieved by the present invention wherein there is provided a self-watering planter for plants or the like having a low evaporative water loss rate. The planter includes a water reservoir having at least one sealable opening for receiving water therein, a wick and absorbent mat assembly disposed atop the reservoir, and a plant container disposed atop the absorbent mat. A portion of the wick is immersed in water contained in the reservoir to transfer water to the absorbent mat through capillary action.

Openings formed in the base of the plant container allow moisture from the mat to be drawn by capillary action into growing media disposed within the plant container.

In the broadest aspect of the invention, the mat may be seated in a recess, on the top of the water reservoir, or on the bottom of the plant container and thus is sealed. In the embodiment shown, the plant container includes a downwardly extending rim, formed as part of the base, which completely covers and seals the absorbent mat when the container is seated atop the water reservoir to prevent evaporation of moisture from the mat directly to the atmosphere.

In one embodiment, complementary indentations and openings are formed in the plant container and water reservoir, respectively, which, when aligned, allow the reservoir to be filled with water without removing the plant container or absorbent mat assembly. When the plant container is rotated so that the water receiving indentations and openings are not aligned, the water reservoir is sealed to prevent evaporation of water from the reservoir directly to the atmosphere.

In another embodiment, the sealable opening is formed in a wall of the water reservoir with a removable stopper inserted therein to prevent evaporation of water in the reservoir directly to the atmosphere.

BRIEF DESCRIPTION OF THE DRAWING FIGURES

These and other features and advantages of the present invention are presented in considerable detail in the following detailed description of the preferred embodiments taken in conjunction with the accompanying drawing figures, wherein:

FIG. 1 is a cross-sectional view of a first embodiment of the self-watering planter of the present invention;

FIG. 2 is a perspective view of the planter assembly of FIG. 1;

FIG. 3 is an exploded perspective view showing the arrangement of components comprising the planter of FIG. 1;

FIG. 4 is a cross-sectional view of a second embodiment of a self-watering planter;

FIG. 5 is a perspective view of the planter of FIG. 4; and

FIG. 6 is an exploded perspective view showing the arrangement of components comprising the planter of FIG. 4.

DETAILED DESCRIPTION OF THE PREFERRED EMBODIMENTS

A self-watering planter 1, shown in FIGS. 1–3, comprises a water reservoir 3, an absorbent mat 5 disposed on a removable lid 7, and a separable plant container 9 containing growing media 11. A plant 14, or the like, is disposed within plant container 9 and surrounded by growing media 11.

Water reservoir 3, lid 7, and plant container 9 are formed from glazed ceramic, molded plastic, or other water-tight materials. Although water reservoir 3, lid 7, and plant container 9 are shown having generally circular horizontal cross-sections, it is understood that various other shapes can be used.

Water reservoir 3 includes a relatively flat, horizontal base 12, side walls 13, and an open top portion 15. An annular recessed area 17 is formed about the periphery of open top portion 15. Annular area 17 includes one or more watering openings 19 formed therein.

Lid 7 is formed of sufficient size to sealingly fit over opening 15 formed in water reservoir 3. Lid 7 includes a lip 21 formed around the periphery thereof which rests on annular area 17. Lid 7 does not cover any one of the water-receiving openings 19 formed in annual area 17. Lid 7 is readily removable from its position over opening 15 of reservoir 3 so that the interior of reservoir 3 can be cleaned or sterilized, if desired. Alternatively, lid portion 7 can be made as an integral part of annual area 17.

Lid 7 also includes an opening 23 formed therein for receiving a wick portion 25 of absorbent mat 5. Wick 25 has one end in contact with absorbent mat 5. The other end of wick 25 is immersed in water 27 contained in reservoir 3. Wick 25 can be formed as an integral part of mat 5 or as a separate piece in contact with mat 5. Both wick 25 and mat 5 are formed from a water-absorbing material exhibiting good capillary action, such as felt and various other types of water-absorbing materials. Water 27 from reservoir 3 is drawn up through wick 25 by capillary action to thoroughly wet absorbent mat 5. The cross-section and absorbency of mat 5 and wick 25 are chosen to provide a constant supply of moisture to plant container 9 at an acceptable rate for a relatively wide range of plant species. With a constant source of moisture available to the growing media and plant disposed in the plant container, the proper moisture/aeration ratio necessary for the cultural requirements of individual species of plants can be obtained by altering the composition of the growing medium disposed in the plant container.

Plant container 9 includes a recessed base 29, side walls 31, and an open top portion 33. Base 29 includes one or more openings 35 formed therein for communicating moisture from absorbent mat 5 to growing media 11 disposed within plant container 9. Base 29 of plant container 9 is recessed by a downwardly extending rim 37 formed as part of the lower portion of side walls 31. One or more openings 39 are formed in base 29 and a lower portion of wall 31 of plant container 9. Indentation 39 is formed complementary to water-receiving openings 19 of water reservoir 3.

When lid 7 and plant container 9 are assembled atop water reservoir 3, rim 37 of container 9 rests along an outer portion of recessed annular area 17. Base 29 of plant container 9 is in contact with the upper surface of absorbent mat 5. Rim 37 of container 9 covers the periphery of absorbent mat 5. This arrangement prevents evaporative loss of moisture from the edge of absorbent mat 5 directly to the atmosphere.

As shown in FIG. 2, when indentations 39 of plant container 9 are disposed directly over and aligned with watering openings 19 formed in water reservoir 3, the water level in reservoir 3 can be readily checked or refilled without disassembly of plant container 9 or lid 7 from reservoir 3. Plant container 9 can be rotated about its central vertical axis such that indentations 39 are no longer aligned with water openings 19. In this position, water reservoir 3 is sealed and evaporative loss of water from reservoir 3 is thus prevented. The reduced evaporative water losses of the planter of the present invention allows a plant to be supplied at a constant rate with the proper amount of water over a longer period of time compared to other types of self-watering plant containers.

An alternative embodiment of a self-watering planter 1a is shown in FIGS. 4–6. Planter 1a is similar in construction to container assembly 1, shown in FIGS. 1–3, and includes a water reservoir 3a, lid member 7a, and plant container 9a. Water reservoir 3a includes a base 12a, side walls 13a, and an open top portion 15a. A recessed annular area 17a is formed about opening 15a of reservoir 3a. A sealable opening 41 is formed in an upper portion of reservoir wall 13a to enable reservoir 3a to be readily refilled with water. A stopper 43 or other sealing means is inserted into opening 41 to seal the reservoir and to prevent evaporative water loss therefrom directly to the atmosphere.

Removable lid 7a includes a lip portion 21a formed along a lower portion thereof which rests upon annular area 17a of reservoir 3a, as shown in FIG. 4. An absorbent mat 5a is disposed on an upper surface of lid 7a and includes a wick portion 25a extending through an opening 23a formed in lid 7a. Wick 25a has a portion immersed in water 27a contained in water reservoir 3a.

Plant container 9a includes a recessed base 29a, side walls 31a, and an open top portion 33a. Openings 35a are formed in base portion 29a to allow moisture from absorbent mat 5a to communicate with growing media 11a disposed within plant container 9a. A plant or the like 14a is disposed within growing media 11a.

When base portion 29a of plant container 9a is disposed atop absorbent mat 5a, downwardly extending rim portion 37a of plant container 9a contacts annular area 17a of water reservoir 3a and covers the periphery of absorbent mat 5a. The mat and reservoir are thus sealed to prevent evaporative water loss directly to the atmosphere. The water level in reservoir 3a is readily checked or refilled by removing stopper 43 from opening 41 in reservoir 3a.

Both embodiments of the present invention provide a self-watering planter having desirably low evaporative water losses. Sealing means, incorporated directly into the design of the self-watering plant allow ready inspection or refill of the water level in the water reservoir without disassembly of the planter. With their reduced evaporative water losses, the self-watering planters of the present invention need refilling substantially less often than other types of self-watering plant containers having reservoirs or absorbent mats exposed to the surrounding atmosphere. The reduced evaporative water losses of the present invention also ensure that substantially all of the water contained in the water reservoir is supplied to the growing media. The self-watering planter of the present invention is easily manufactured in various shapes and sizes from a variety of water-tight materials.

While the self-watering planter of the present invention has been described in considerable detail, it is understood that various changes and modifications would occur to one of ordinary skill in the art without departing from the spirit and scope of the appended claims.

I claim:

1. A self-watering planter for plants or the like, comprising:
   a water reservoir including at least one sealable opening for receiving water therein;
   a lid member on said water reservoir;
   a wick and absorbent mat disposed atop said lid member of said reservoir, said wick communicating water contained in said reservoir to said absorbent mat; and
   a plant container disposed atop said absorbent mat, said plant container including at least one opening formed in a base portion thereof for communicating moisture from said absorbent mat to growing media contained in said plant container,
   recess means on said plant container for receiving and enclosing the periphery of said lid member of said reservoir and said absorbent mat when said plant container is seated atop said water reservoir to prevent evaporation of moisture from said absorbent mat and said reservoir directly to the atmosphere.

2. The self-watering planter of claim 1 wherein said sealable opening comprises an opening formed on an outer wall of said water reservoir, said opening selectively sealed by a stopper means to prevent evaporation of water from said water reservoir directly to the atmosphere.

3. The self-watering planter of claim 1, wherein said lid member is removable and having at least one opening formed therein, said lid member disposed atop said water reservoir, said absorbent mat disposed atop said removable lid with said wick projecting through said lid opening into said water reservoir.

4. A self-watering planter for plants or the like, comprising:
   a water reservoir including at least one sealable opening for receiving water therein;
   a wick and absorbent mat disposed atop a portion of said reservoir, said wick communicating water contained in said reservoir to said absorbent mat; and
   a plant container disposed atop said absorbent mat, said plant container including at least one opening formed in a base portion thereof for communicating moisture from said absorbent mat to growing media contained in said plant container,
   recess means on said planter for receiving and enclosing the periphery of said absorbent mat when said plant container is seated atop said water reservoir to prevent evaporation of moisture from said mat and said reservoir directly to the atmosphere, said recess means including a lower rim formed as part of said base portion of said plant container and of sufficient size to cover said absorbent mat, and said sealable opening comprises at least one opening formed in said reservoir adjacent said wick and absorbent mat, said plant container including at least one complementary indentation formed along a wall thereof, whereby when said opening in said reservoir and said complementary indentation in said plant container wall are aligned, said water reservoir can be filled with water without removing said plant container from atop said reservoir, and when said opening in said reservoir and said complementary indentation in said plant container wall are not aligned, said reservoir opening is sealed to prevent evaporation of water from said water reservoir directly to the atmosphere.

5. A self-watering planter, comprising:
   a water reservoir having a base, side walls, and an open top portion, said walls including at least one sealable opening for receiving a removable stopper;
   a lid adapted to sealingly fit over said open top portion of said water reservoir, said lid including at least one opening formed therein;
   an absorbent mat disposed atop said lid, and a wick disposed through said lid opening to transfer water contained in said reservoir to said absorbent mat through capillary action; and
   a plant container disposed atop said absorbent mat and water reservoir, said plant container having a base, side walls, and an open top portion, said plant container including:
      at least one opening formed in said base for communicating moisture from said absorbent mat to growing media contained in said plant container; and
      a rim formed as part of said container side walls and extending downwardly beyond said container base adjacent said sidewall, said rim of said container contacting said water reservoir and enclosing the periphery of said absorbent mat when said plant container is seated atop said water reservoir to prevent evaporation of moisture from said absorbent mat and said reservoir directly to the atmosphere.

6. A self-watering planter, comprising:
   a water reservoir having a base, side walls, and an open top portion including an annular area formed about the periphery of said open top portion, said annular area having at least one sealable opening formed therein;
   a lid adapted to sealingly fit over said open top portion of said water reservoir, said lid including at least one opening formed therein;
   an absorbent mat disposed atop said lid, and a wick disposed through said lid opening to transfer water contained in said reservoir to said absorbent mat through capillary action; and
   a plant container disposed atop said absorbent mat and water reservoir, said plant container having a base, side walls, and an open top portion, said plant container including:
      at least one opening formed in said base for communicating moisture from said absorbent mat to growing media contained in said plant container;
      a rim formed as part of said container side walls and extending downwardly beyond said container base adjacent said sidewall, said rim of said container contacting said annular area of said water reservoir and enclosing the periphery of said absorbent mat when said plant container is seated atop said water reservoir to prevent evaporation of moisture from said mat directly to the atmosphere; and at least one indentation formed in said plant container walls, said indentation complementary with said at least one sealable opening formed in said annular area of said water reservoir, whereby when said opening in said reservoir and said complementary indentation in said plant container are aligned, said water reservoir can be filled with water without removing said plant container from atop said reservoir, and when said opening in said reservoir and said complementary indentation in said plant container are not aligned, said reservoir opening is sealed to prevent evaporation of moisture from said reservoir directly to the atmosphere.

7. The planter of either claim 5 or claim 6 wherein said lid is formed integral with said top portion of said water reservoir.

* * * * *